United States Patent [19]

Gluza

[11] 4,419,827

[45] Dec. 13, 1983

[54] MODULAR DEVICE FOR AUTOMATIC DIMENSIONAL GAUGING OF ROTATION PARTS

[75] Inventor: Roland Gluza, Bazainville, France

[73] Assignee: Regie Nationale Des Usines Renault, Boulogne-Billancourt, France

[21] Appl. No.: 316,280

[22] Filed: Oct. 29, 1981

[30] Foreign Application Priority Data

Nov. 6, 1980 [FR] France ............................. 80 23746

[51] Int. Cl.³ ............................................. G01B 7/12
[52] U.S. Cl. ................................... 33/174 L; 209/538; 33/147 L
[58] Field of Search ............. 33/178 R, 178 E, 174 Q, 33/174 L, 174 R, 147 L; 209/519, 530–533, 601–603, 538, 546

[56] References Cited

U.S. PATENT DOCUMENTS

| | | | |
|---|---|---|---|
| 2,738,197 | 3/1956 | Stevens | 209/538 X |
| 3,618,762 | 11/1971 | Sklar | 33/174 L X |
| 3,670,420 | 6/1972 | Kiewicz et al. | 33/172 E X |
| 3,974,569 | 8/1976 | Albertazzi . | |
| 3,975,829 | 8/1976 | Possati | 33/147 N X |
| 4,049,123 | 9/1977 | Fegley . | |

FOREIGN PATENT DOCUMENTS 2276558 1/1976 France .
746860 3/1956 United Kingdom .

Primary Examiner—Harry N. Haroian
Attorney, Agent, or Firm—Oblon, Fisher, Spivak, McClelland & Maier

[57] ABSTRACT

The modular fixture is in the form of a hollow chassis mounted on a base through which a chute extends for delivering parts for gauging. Gauging is provided by a plurality of modules fixed to reference surfaces of the chassis. A support module contains a mandrel mounted on a spindle for grasping and holding the parts during gauging. Gauge modules contain movable supports for sensors or feelers which gauge the parts. A movable stop and a movable fork associated with the chute cooperate to stop and support the part as it is being grasped by the mandrel. The modular nature of the fixture permits rearrangement of the modules such that parts of different types can be gauged.

6 Claims, 4 Drawing Figures

MODULAR DEVICE FOR AUTOMATIC DIMENSIONAL GAUGING OF ROTATION PARTS

BACKGROUND OF THE INVENTION

1. Field of the Invention

The invention concerns the dimensional gauging of a series of solids of revolution during the manufacture or assembly thereof.

2. Description of the Prior Art

In order to resolve this problem, other than by manual gauging of the parts on a measuring bench, automatic devices inside which the parts arrive in succession on a chute and are removed one by one by a mobile mandrel mounted onto a support, with measuring feelers mounted onto the support in an adjustable way, and set with accuracy, are known.

Such machines, however, are type specific. That is, they are designed and adjusted for a particular type of part and they do not make it possible to easily and quickly switch from one type of part to another. Indeed, it is usually necessary to change the intake chute for the parts in order to adapt it to the new parts, and also to change the number and type of feelers as well as their support and especially their adjustment, which requires a fairly long time.

SUMMARY OF THE INVENTION

The object of the invention is to eliminate the previous disadvantages by providing an automatic universal dimensional gauging machine which makes it possible to switch easily and quickly from one type of part.

The device according to the invention includes a support, which is similar to a perforated parallelepiped with accurate references sides. The device also includes an intake chute for parts crossing the support and including stop and positioning means for the parts, the chute being adjustable in vertical position and variable in width as well as incline in order to adapt to various types of parts. Also included is a support module including a base which is affixed to one of the support reference sides and a spindle ending in a mandrel for gripping parts. Attached to said base are rotation drive means of the spindle, the axial translation drive means of the spindle, and the actuating means of the mandrel gripping device.

Finally, one or more gauging modules are each including a frame designed to be affixed and positioned with accuracy on another support reference side, a plate that can be positioned with accuracy against the frame with a point-dash-plane type positioning device, and a plate which is designed to bear the adjustable supports of the various measuring feelers. The gauging module also includes a displacement means to set the plate away from the frame, hence from the support, in order to facilitate the removal of one part and the intake of a new part, and to return the plate against its positioning device.

Changing the type of part, therefore, can be accomplished extremely quickly by simple position and width adjustment of the chute and by a simple standard exchange of the measuring modules or of their plate, as well as optionally the mandrel or the support module.

BRIEF DESCRIPTION OF THE DRAWINGS

Various other objects, features and attendant advantages of the present invention will be more fully appreciated as the same becomes better understood from a detailed description of the drawings wherein like reference characters designate like or corresponding parts throughout the several views, and wherein.

DETAILED DESCRIPTION OF THE PREFERRED EMBODIMENTS

Figure 1:
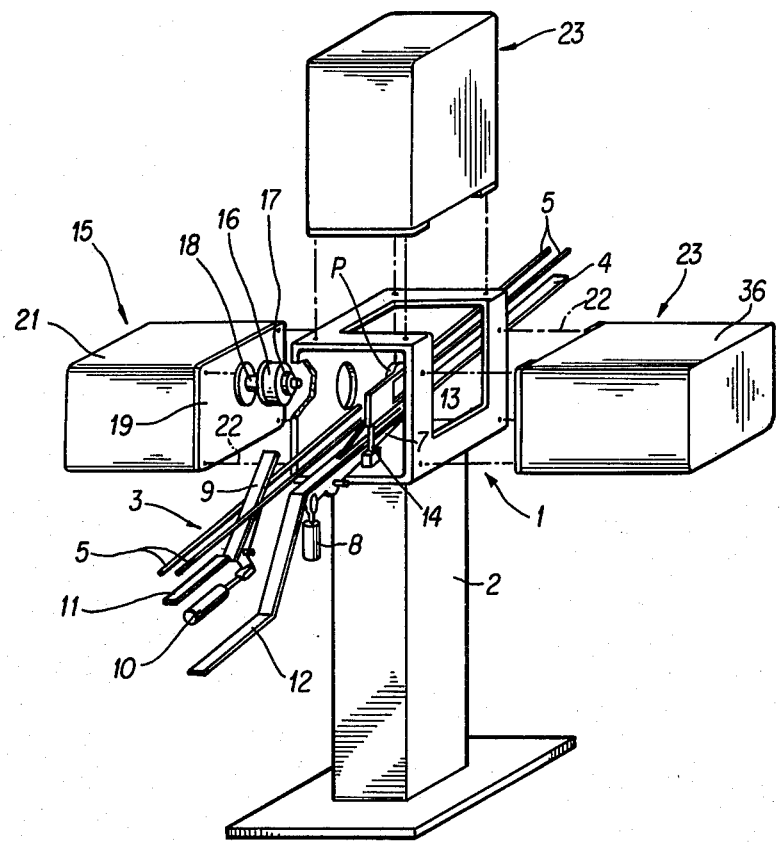
FIG. 1 is an overall exploded view in perspective of the major components of the invention.

As one can see in FIG. 1, the device according to the invention is composed basically of a support 1 on which is affixed a number of removable and combining modules.

The support 1 is basically a hollow, rigid structure shaped like a parallelepiped with perforated sides. It can be supported by a stand 2. The support includes wide openings in the front and back through which the entire chute unit passes, the chute being designed to accomodate the parts to be measured, to gauge them one by one and to sort them in response to the gauging findings. The chute itself is comprised of a flat rail forming the running surface for the parts to be measured, surrounded by two guide rods 5 channeling each part between them. Each guide rod 5 is held by supports 6 (see FIG. 2) positioning the guide rods in an adjustable way in height as well as in width relative to the rail 4. Moreover the unit can be adjusted by other adjustment means (not shown) in height or on an incline relative to the support 1.

Figure 2:
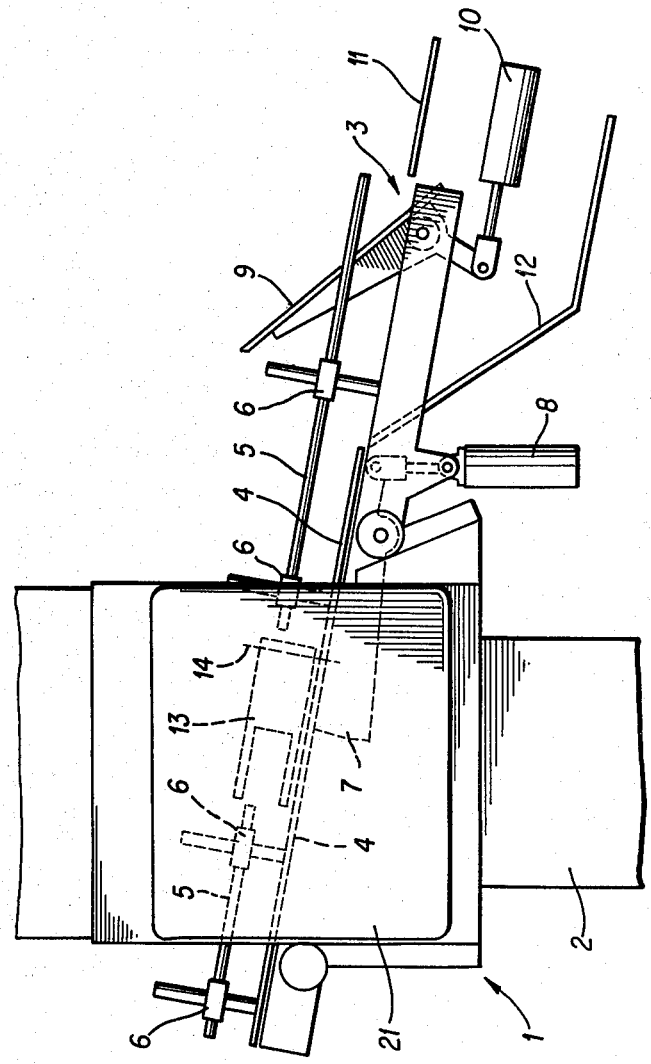
FIG. 2 is an enlarged elevated view of the support and the chute.

In the vicinity of the middle of the support 1, there is a concealable stop 7, for instance shaped as a circular sector as illustrated in FIG. 2, and which can protrude through a notch made in the rail 4, or which can be reversed to disappear flush with or below the level of the rail by the action of a control jack 8.

The sorting device consists of a pivoting blade 9, controlled by a jack 10 and making it possible to join when in its lowered position, the rail 4 to an extending rail 11, in order to remove the acceptable parts. In an elevated position, as illustrated in FIGS. 1 and 2, this blade 9 permits the parts to move into a chute 12, also equipped with lateral guides that are not illustrated, in order to remove the unacceptable parts. The jack 10 operation is controlled by the gauging operation which will be described next.

At the site of the gauging, or at the site of part P stopped by the stop 7 on the rail 4, one of the rods 5 is removed and replaced by a part support fork 13. This fork is mounted for movement such as by pivoting around an axis 14 and activated by an appropriate device so as to slightly separate itself from the support position of the part during the measurement. This control can be combined with the motion of the stop 7 to be activated by the same jack 8.

Aside from the lower side which is occupied by the stand, and the perforated front and back for accommodating the chute unit 3, the support 1 also includes three accurately tooled reference sides for making possible the accurate assembly of the various modules.

Figure 3:
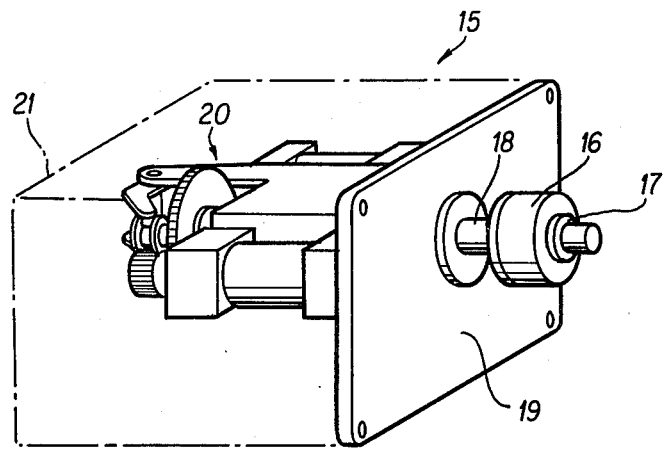
FIG. 3 is an enlarged view in perspective of the display module.

The first of those modules is support module 15 which is responsible for taking the stopped part at the gauging station, positioning it accurately in relation to the support 1 and orienting or driving it in rotation around its rotational axis to enable the successive action of the measuring feelers (measurement of radial or lateral runout). This module 15 is illustrated in detail in FIG. 3. It includes a centering mandrel 16 which grips part P, by the inside or by the outside, with an accurate reference surface 17 that is contacting the part, either on one of its sides, or via a recess. The reference surface can also be static instead of borne by the mandrel depending on the application.

This mandrel 16 is borne by a spindle 18 which can rotate accurately in bearings and slide axially in those bearings. Of course, the accuracy of the spindle and bearings determines the accuracy of the anticipated measurements. The bearings are borne by an accurately tooled base 19 which can be affixed accurately on one reference side of the support 1. This side is usually the vertical side opposite the fork 13 for parts running on the rail 4 by their outer cylindrical surface and consequently with their rotational axis horizontal, but the module can also be affixed to the upper side of the support 1 for parts sliding on the rail 4 with their rotational axis vertical.

The mandrel 16 and the tip of the spindle 18 penetrate through the corresponding reference side of the support 1 through the illustrated perforations, and on the other side, the module 15 includes the rotation and translation driving means of the spindle 18, as well as the actuating means of the mandrel 16 gripping device. This mechanism designated overall as 20 is well known and is enclosed inside a housing 20 so as to constitute a protected and easily handled unit. Of course, the accurate fastening of the base 19 onto the corresponding reference side of the support 1 is accomplished by any appropriate method, especially with bolts 22, with plane on plane support and accurate positioning in that plane with stops or dowels in the conventional way.

Figure 4:
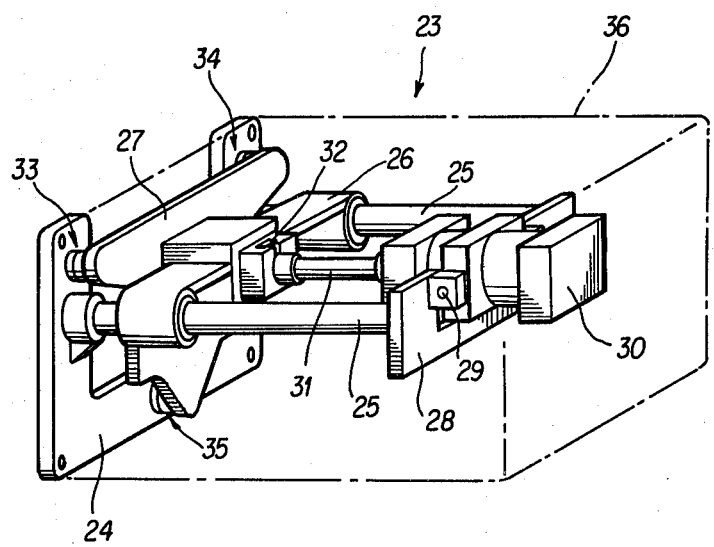
FIG. 4 is an enlarged view in perspective of a gauging module.

Another module is comprised of the measuring module 23 illustrated in FIG. 4. This module 23 includes a frame 24 forming the base of the module and designed, like the base 19, to be affixed to one of the reference sides of the chassis 1, for instance with bolts 22, accurately positioned with stops or dowels that are not illustrated. This frame 24 includes a guidance device, comprised for example of two columns 25 for a slide 26 which slides on those columns 25, for instance with bearing, and that slide 26 includes, with some degree of play in all directions, a plate 27 upon which the various measuring feelers are mounted with known and not illustated adjustable supports. Obviously, those feelers are fastened onto the side of the plate facing the side of the chassis 1, and the frame 24 includes, like the corresponding side of the chassis 1, a wide perforation for allowing passage of the feelers. In particular, the frame 24 can be limited to a U-shaped frame as illustrated on the Figures.

The ends of the columns 25 opposite the frame 24 are connected by a cross-bar 28 carrying two articulation bearings 29 upon which a jack 30 is articulated. The end of the rod 31 is introduced and locked laterally inside a T-shaped ridge 32 leading out of one side of the slide 26. This arrangement enables a swift removal of the jack 30 and of its rod 31 by tilting, which permits rapid manual displacement of the slide 26 towards the cross-bar 28 in order to have access to the feelers so as to facilitate their installation and adjustment.

When each new part P descends, the plate and its feelers are retracted by the rod 31 so that the feelers are outside of the path of the part. Conversely, during measuring, after part P has been grasped and positioned by the mandrel 16, the entire plate and its feelers are accurately brought into position.

The accuracy of that positioning, renewed for each operation, is obtained by resting the plate 27 onto the frame 24 at three points 33, 34, and 35 with the method known as point-dash-plane. It may be recalled that this method involves positioning one of the points, for instance 33, with a boss, spherical for example, borne by one of the parts, either static or mobile, and lodged into an indentation, conical for example, borne by the other part, so as to ensure accurate positioning in three dimensions of the point 33. Another point 34 also includes a boss, spherical for example, which cooperates in this instance with a rectilinear groove, V-shaped for example, preferably aligned with point 33, which establishes the direction of part 27 in the plane of the three points. Finally, at the third point 35, thrust is carried out directly onto a plane in order to complete the definition of the position of the plate plane 27 in spatial terms by setting the direction of that plane around the line 33, 34.

The module 23, like module 15, is obviously enclosed inside a protective housing 36 to make it into an easily conveyable and installable unit. Furthermore, it is possible to use two similar modules as shown on FIG. 1, the second module being placed for instance on the upper surface if it is not used for module 15. This gives more flexibility and choice as to the types of measurements that can be made.

Of course, and as is usual, the measuring feelers transmit their measurement, for instance electrically, to a device that verifies if they are all within imposed limits, and if affirmative it simultaneously activates the jack 10 and the jack 8 to deliver the part P to the good parts. Conversely, the jack 8 is the only one activated to permit the delivery of part P by rail 12 to the unacceptable parts.

Naturally, a non illustrated part separation and distribution device, which is not part of the invention, distributes the parts P one by one at the entrance of the chute 3, and a conventional control unit controls the sequence of operations by activating the jack 8 of stop 7 to stop each new part, the translation displacement of the spindle 18 to permit the grasping of the part by the mandrel 16, due to the support given by the fork 13, as well as the retraction of the stop 7 simultaneously with the removal of the fork 13, which permits the mandrel 16 to rotate the part for several revolutions, for instance to verify the displacement or concentricity of the part. During that rotation, or in the stop position of the parts according to the situation, the feeler units will contact the part to ensure gauging, then withdraw. Following this, the mandrel 16 retracts and withdraws to eject the part that then rolls to the sorting device for selection.

Therefore, the unit is completely automatic and extremely accurate. Furthermore, when it is desired to change the type of part to gauge, all that is needed is to alter the position and width of the chute 3 as described above, then perform a standard exchange of the support module 15 and gauging module 23, or simpler still of the mandrel 16 followed by the plate 27, or of a measuring head that includes a plate bearing all the pre-adjusted feelers and which is affixed onto the plate 27. The latter exchange is especially facilitated by the rapid tilt release of the jack 30. Thus, the same device permits extremely rapid gauging of very different parts series.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fixture for the automatic gauging of parts having the shape of a solid of revolution, said fixture comprising:

a hollow chassis having perforated sides that include a plurality of tooled reference surfaces;

a support module including a base fixed to one of said reference surfaces;

a spindle supported in said support module for rotational and translational movement, one end of said spindle extending into said chassis;

a mandrel for grasping and carrying said parts, fixed to said spindle;

at least one gauge module, each said at least one gauge module fixed to one of said reference surfaces;

a feeler assembly movably mounted in each said at least one gauge module for movement between an inactive position and an active position wherein said feeler assembly is positioned adjacent a part held by said mandrel; and a chute passing through said chassis for bringing said parts to said mandrel, the position, height and width of said chute being adjustable for adaptation to various types of said parts.

2. The fixture of claim 1 wherein:

said base of said support module supports bearings of said spindle and supports means for rotationally and translationally driving said spindle and means for operating said mandrel;

each said gauge module includes a frame fixed to one of said reference surfaces of said chassis; and said feeler assembly includes a movable plate associated with said frame, said plate supporting said feelers, and means for moving said plate between said active and inactive positions.

3. The fixture of claims 1 or 2 wherein said chute includes:

a stop element movable into said chute adjacent said mandrel for stopping said part at said mandrel;

a fork forming a portion of said chute adjacent said mandrel, said fork being movable into contact with a part in said chute for supporting said part during grasping by said mandrel; and means for actuating said stop element and said fork.

4. The fixture of claim 2 wherein said frame of each said gauge module, and the reference surface upon which each said gauge module is mounted, are U-shaped.

5. The fixture of claim 2 wherein said movable plate of said feeler assembly comprises a block, and wherein said means for moving said plate comprise:

a crossmember;

a pair of slides extending between said crossmember and said frame, said block sliding on said slides; and an actuating cylinder mounted on said crossmember, said actuating cylinder including a rod connected to said block.

6. The fixture of claim 5 wherein said actuating cylinder is pivotally mounted on said crossmember, and wherein the connection of said cylinder rod to said block comprises a T-shaped slot in said block and a head mounted to one end of said cylinder rod and insertable in said block, whereby said cylinder can be quickly engaged and disengaged with said block.

* * * * *